(12) United States Patent
Nakahashi

(10) Patent No.: US 10,552,434 B2
(45) Date of Patent: Feb. 4, 2020

(54) INFORMATION PROCESSING DEVICE, CONTROL METHOD, AND PROGRAM

(71) Applicant: SONY CORPORATION, Tokyo (JP)

(72) Inventor: Ryo Nakahashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 170 days.

(21) Appl. No.: 15/314,682

(22) PCT Filed: Apr. 9, 2015

(86) PCT No.: PCT/JP2015/061162
§ 371 (c)(1),
(2) Date: Nov. 29, 2016

(87) PCT Pub. No.: WO2016/002298
PCT Pub. Date: Jan. 7, 2016

(65) Prior Publication Data
US 2017/0199918 A1    Jul. 13, 2017

(30) Foreign Application Priority Data

Jun. 30, 2014 (JP) .................. 2014-134660

(51) Int. Cl.
| | |
|---|---|
| G06F 7/00 | (2006.01) |
| G06F 17/30 | (2006.01) |
| G06F 16/248 | (2019.01) |
| G06F 16/2457 | (2019.01) |
| G06Q 30/02 | (2012.01) |
| G06Q 50/12 | (2012.01) |

(52) U.S. Cl.
CPC ...... G06F 16/248 (2019.01); G06F 16/24578 (2019.01); *G06Q 30/0257* (2013.01); *G06Q 50/12* (2013.01)

(58) Field of Classification Search
CPC .......... G06F 17/30554; G06F 17/3053; G06F 16/24578; G06F 16/248; G06F 16/0257; G06Q 50/12
USPC .......... 707/694, 722, 727, 740, 827
See application file for complete search history.

(56) References Cited

U.S. PATENT DOCUMENTS

| | | | | |
|---|---|---|---|---|
| 2009/0248671 | A1* | 10/2009 | Maruyama | ........ G06F 17/30707 |
| 2013/0338822 | A1* | 12/2013 | Gibson, Jr. | ............. G07F 17/12 700/237 |
| 2014/0282257 | A1* | 9/2014 | Nixon | .................... G05B 11/01 715/835 |

FOREIGN PATENT DOCUMENTS

| | | |
|---|---|---|
| JP | 2008-070377 A | 3/2008 |
| JP | 2009-244950 A | 10/2009 |
| JP | 2011-175362 A | 9/2011 |

(Continued)

*Primary Examiner* — Md I Uddin
(74) *Attorney, Agent, or Firm* — Xsensus LLP

(57) ABSTRACT

To provide an information processing device, a control method, and a program that can determine the granularity of information at the presentation of the information in accordance with a user status. An information processing device including: a retrieval unit that retrieves information in response to a request of a user; an acquisition unit that acquires information on a current user status; a determination unit that determines granularity of information according to the acquired information on the user status when the retrieved information is presented; and a presentation control unit that controls presentation of the retrieved information with the determined granularity of information.

15 Claims, 20 Drawing Sheets

| CONTEXT TYPE | CONTEXT | DISPLAY FORMAT |
|---|---|---|
| NUMBER OF ACCOMPANYING PERSONS | ONE PERSON | INFORMATION LIST/NO IMAGE |
| | TWO OR MORE PERSONS | DETAILED INFORMATION/IMAGE DISPLAY |
| LOCATION | IN TRAIN | INFORMATION LIST/NO IMAGE |
| | HOME | DETAILED INFORMATION/IMAGE DISPLAY |
| TIME | MORNING | INFORMATION LIST/NO IMAGE |
| | NIGHT | DETAILED INFORMATION/IMAGE DISPLAY |

CONTEXT ⇔ DISPLAY FORMAT PREFERENCE

(56) References Cited

FOREIGN PATENT DOCUMENTS

| JP | 2011-227717 A | 11/2011 |
| JP | 2013-254395 A | 12/2013 |

* cited by examiner

FIG. 3

| CONTEXT TYPE | CONTEXT | RETRIEVAL INFORMATION |
|---|---|---|
| TIME | DAYTIME | SET-MEAL RESTAURANT INFORMATION |
| | NIGHT | RESTAURANT INFORMATION |
| DAILY LIFE | ORDINARY | NEWS |
| | EXTRAORDINARY | SIGHTSEEING INFORMATION |

CONTEXT ⇔ RETRIEVAL INFORMATION PREFERENCE

FIG. 4

| CONTEXT AND SO ON | EXAMPLE OF CHANGE OF DISPLAY FORMAT |
|---|---|
| TIME | NEWS DISPLAY; MORNING → SUMMARY LIST DISPLAY FOR QUICK CHECK NIGHT → FULL-TEXT LIST DISPLAY FOR CAREFUL READING |
| LOCATION | NEWS DISPLAY; HOME → WITH PICTURES, COMPANY → NO PICTURE |
| NUMBER OF ACCOMPANYING PERSONS | RESTAURANT INFORMATION RETRIEVAL; ONE USER → SUMMARY LIST DISPLAY FOR QUICK CHECK TWO OR MORE USERS → PICTURE DISPLAY FOR SHARING INFORMATION |
| STATUS/ACTION | NEWS DISPLAY; IN TRAIN (STANDING) → SUMMARY LIST DISPLAY SITTING → FULL-TEXT DISPLAY |
| DAILY LIFE | RESTAURANT INFORMATION RETRIEVAL; FAMILIAR LOCATION → SUMMARY LIST DISPLAY UNFAMILIAR LOCATION → LIST DISPLAY WITH PICTURES |
| ACCOMPANYING PERSON | RESTAURANT INFORMATION RETRIEVAL; WITH MR./MS. A WHO IS INTERESTED IN PICTURES → PICTURE DISPLAY WITH MR./MS. B WHO IS INTERESTED IN CONTENTS → ONLY DETAIL OF RESTAURANT |
| DEVICE USED | RESTAURANT INFORMATION RETRIEVAL; CELLULAR PHONE TERMINAL OR SMARTPHONE → ONLY SUMMARY LIST OF RESTAURANTS TABLET TERMINAL → INFORMATION WITH PICTURES |

FIG. 5

| CONTEXT TYPE | CONTEXT | DISPLAY FORMAT |
|---|---|---|
| NUMBER OF ACCOMPANYING PERSONS | ONE PERSON | INFORMATION LIST/NO IMAGE |
| | TWO OR MORE PERSONS | DETAILED INFORMATION/IMAGE DISPLAY |
| LOCATION | IN TRAIN | INFORMATION LIST/NO IMAGE |
| | HOME | DETAILED INFORMATION/IMAGE DISPLAY |
| TIME | MORNING | INFORMATION LIST/NO IMAGE |
| | NIGHT | DETAILED INFORMATION/IMAGE DISPLAY |

CONTEXT ⇔ DISPLAY FORMAT PREFERENCE

FIG. 6

| RETRIEVAL INFORMATION | DISPLAY FORMAT |
|---|---|
| RESTAURANT | DETAILED INFORMATION/IMAGE DISPLAY |
| SET-MEAL RESTAURANT | SUMMARY LIST/NO IMAGE |
| ENTERTAINMENT NEWS | DETAILED INFORMATION/IMAGE DISPLAY |
| SPORTS NEWS | SCOREBOARD DISPLAY |

RETRIEVAL INFORMATION ⇔ DISPLAY FORMAT PREFERENCE

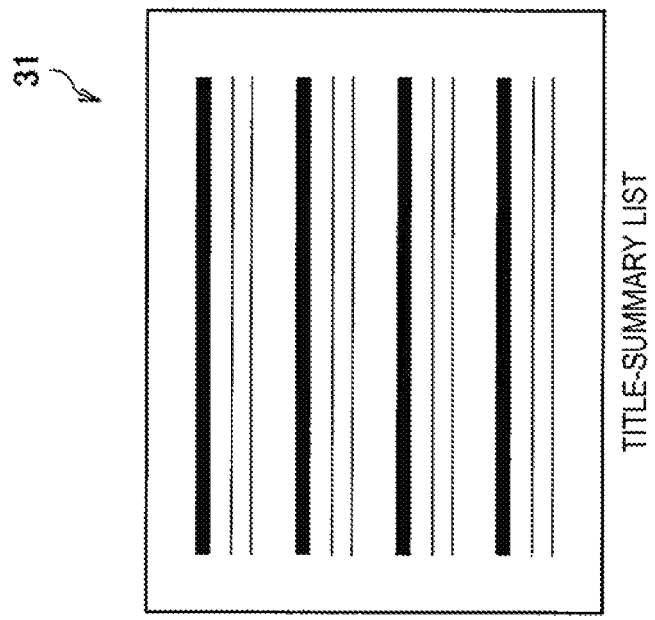
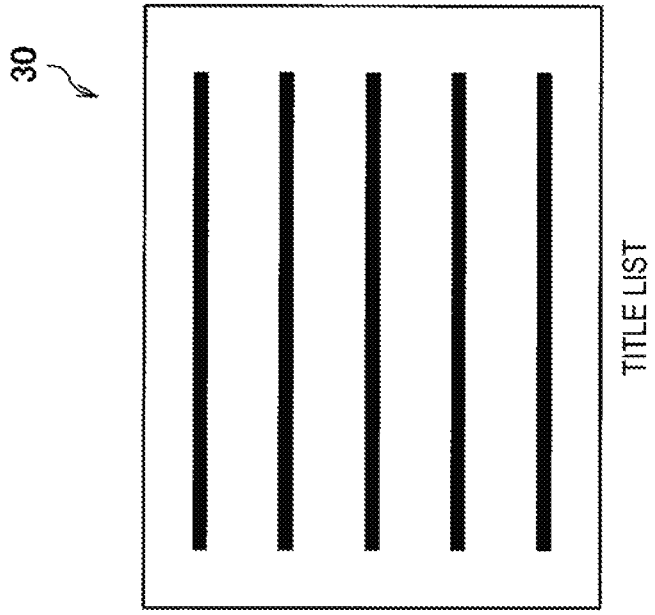
FIG. 7

FIG. 8
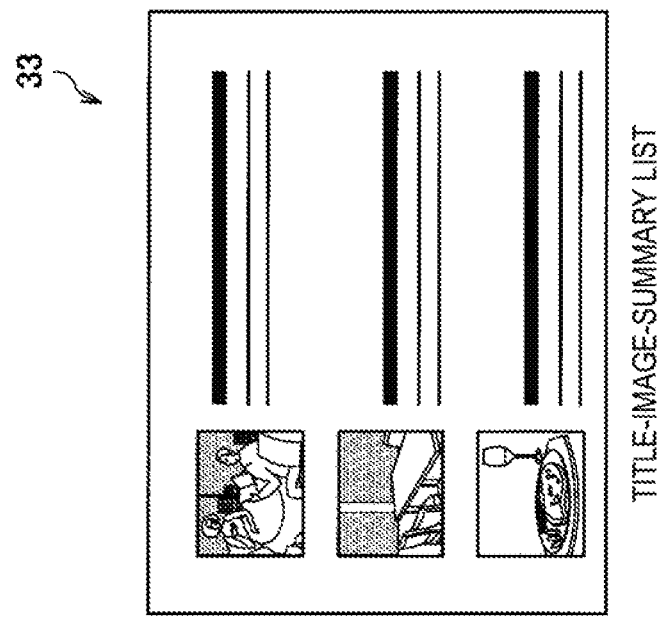
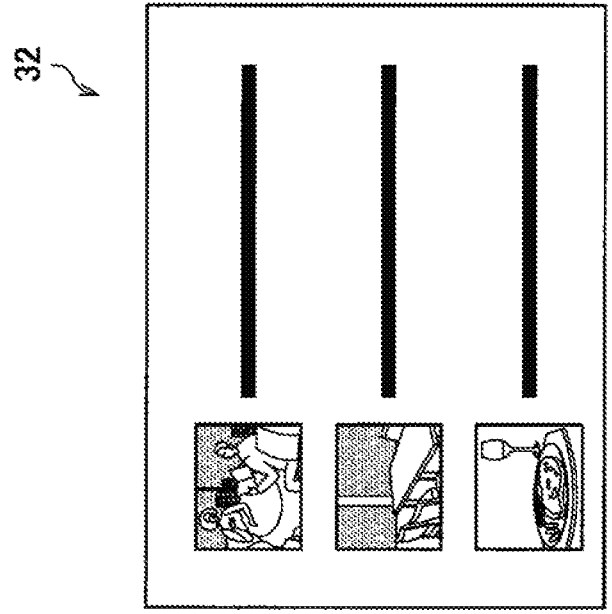

FIG. 9
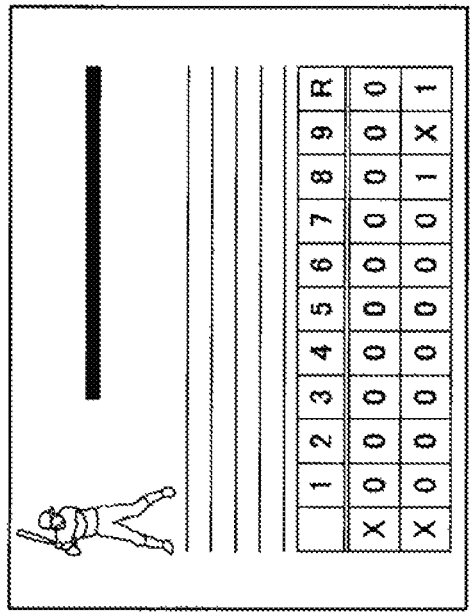
34
DETAILED INFORMATION/IMAGE DISPLAY
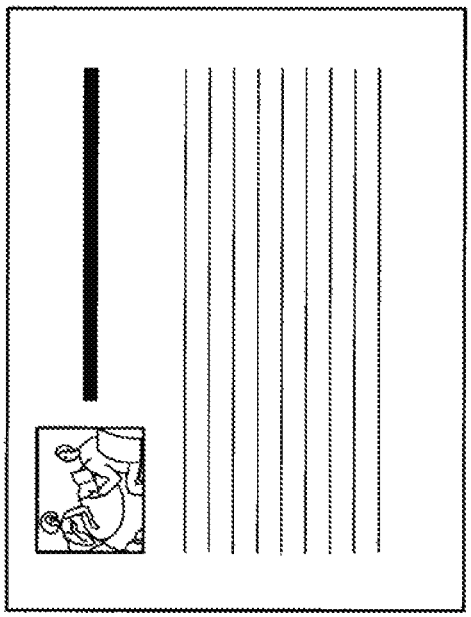
35
DETAILED INFORMATION/IMAGE/OTHER INFORMATION DISPLAY
(EXAMPLE: SPORTS NEWS + SCOREBOARD)

FIG. 10
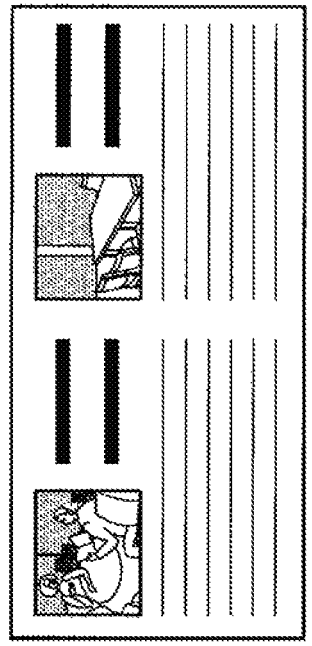
TWO VERTICALLY SPLIT VIEWS
(FOR TABLET TERMINALS)
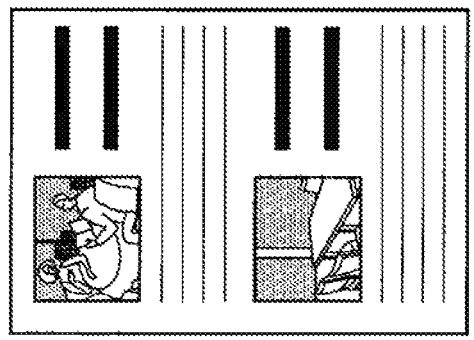
TWO HORIZONTALLY SPLIT VIEWS
(FOR CELLULAR PHONE TERMINALS/SMARTPHONES)

FIG. 14

| CONTEXT AND SO ON | EXAMPLE OF IDENTIFICATION METHOD |
|---|---|
| TIME | IDENTIFICATION FROM INTERNAL CLOCK OF DEVICE |
| LOCATION | IDENTIFICATION FROM GPS OF DEVICE |
| NUMBER OF ACCOMPANYING PERSONS | IDENTIFICATION VIA Bluetooth, INFRARED COMMUNICATION, OR PROXIMITY WIRELESS COMMUNICATION OF DEVICE |
| STATUS/ACTION | IDENTIFICATION FROM SENSOR INFORMATION IN DEVICE |
| DAILY LIFE | STORAGE OF ORDINARY ACTION PATTERN AS MODEL AND IDENTIFICATION BASED ON DIFFERENCE BETWEEN MODEL AND INFORMATION FROM GPS AND SO ON OF DEVICE |
| ACCOMPANYING PERSON | IDENTIFICATION VIA Bluetooth, INFRARED COMMUNICATION, OR PROXIMITY WIRELESS COMMUNICATION OF DEVICE |
| DEVICE USED | IDENTIFICATION FROM DEVICE INFORMATION OF DEVICE |

FIG. 16

VARIATION 1: SCORING FOR EACH CONTEXT TYPE
→ DETERMINE DISPLAY FORMAT ACCORDING TO
SUM OF CONTEXT PRIORITY SCORES

| CONTEXT TYPE | PRIORITY SCORE |
|---|---|
| NUMBER OF ACCOMPANYING PERSONS | 1.5 |
| LOCATION | 2.0 |
| TIME | 0.7 |
| ⋮ | ⋮ |

FIG. 17

VARIATION 2: SCORING FOR EACH CONTEXT
→ DETERMINE DISPLAY FORMAT ACCORDING TO SUM OF CONTEXT PRIORITY SCORES

| CONTEXT TYPE | CONTEXT | DISPLAY FORMAT | PRIORITY SCORE |
|---|---|---|---|
| NUMBER OF ACCOMPANYING PERSONS | ONE PERSON | INFORMATION LIST/NO IMAGE | 2.0 |
| | TWO OR MORE PERSONS | DETAILED INFORMATION/IMAGE DISPLAY | 1.5 |
| LOCATION | IN TRAIN | INFORMATION LIST/NO IMAGE | 2.0 |
| | HOME | DETAILED INFORMATION/IMAGE DISPLAY | 1.0 |
| TIME | MORNING | INFORMATION LIST/NO IMAGE | 1.5 |
| | NIGHT | DETAILED INFORMATION/IMAGE DISPLAY | 0.7 |

FIG. 18

VARIATION 2: SCORING FOR EACH CONTEXT/PERMISSION OF ADDITION OF MULTIPLE SCORES
→ DETERMINE DISPLAY FORMAT ACCORDING TO SUM OF CONTEXT PRIORITY SCORES

| CONTEXT TYPE | CONTEXT | DISPLAY FORMAT |
|---|---|---|
| LOCATION | IN TRAIN | INFORMATION LIST/NO IMAGE (2.0), DETAILED INFORMATION/IMAGE DISPLAY (1.0) |
| NUMBER OF ACCOMPANYING PERSONS | TWO OR MORE PERSONS | DETAILED INFORMATION/IMAGE DISPLAY (1.5) |

FIG. 19

VARIATION 3: CATEGORIZING DISPLAY FORMATS AND SCORING FOR EACH CATEGORY
→ COMBINING CATEGORIES HAVING HIGH TOTAL SCORES

| CONTEXT TYPE | CONTEXT | DISPLAY FORMAT (DETAIL LEVEL) | DISPLAY FORMAT (IMAGE) |
|---|---|---|---|
| LOCATION | IN TRAIN | INFORMATION LIST (2.0) | NO IMAGE (3.0) |
| NUMBER OF ACCOMPANYING PERSONS | TWO OR MORE PERSONS | DETAILED INFORMATION (2.0) | IMAGE DISPLAY (2.0) |
| TIME | NIGHT | DETAILED INFORMATION (0.2) | IMAGE DISPLAY (0.2) |

INFORMATION PROCESSING DEVICE, CONTROL METHOD, AND PROGRAM

CROSS REFERENCE TO RELATED APPLICATIONS

This application is a U.S. National Phase of International Patent Application No. PCT/JP2015/061162 filed on Apr. 9, 2015, which claims priority benefit of Japanese Patent Application No. JP 2014-134660 filed in the Japan Patent Office on Jun. 30, 2014. Each of the above-referenced applications is hereby incorporated herein by reference in its entirety.

TECHNICAL FIELD

The present disclosure relates to an information processing device, a control method, and a program.

BACKGROUND ART

With recent developments in information communication technology, various kinds of content including restaurant information, product information, event information, news, music, video, or electronic books have been provided for users through networks. Retrieval service including keyword or genre retrieval is provided to support users who retrieve information suitable for the users from these vast amounts of content, and recommendation service is provided for recommending content suitable for users through a system.

For extraction of the attributes of content used in the retrieval service and recommendation service, for example, a significance calculation method is proposed in Patent Literature 1 in which the degrees of significance of various attribute combinations are flexibly evaluated from the attributes of content.

CITATION LIST

Patent Literature

Patent Literature 1: JP 2011-175362A

SUMMARY OF INVENTION

Technical Problem

Although a display format is quite a significant factor for presenting various kinds of content to users, conventional information recommendation has focused on only the contents of presented information, but has not taken display formats into consideration.

For example, if the text of presented information is fully displayed, it takes a long time to recognize the whole information. Thus, displaying only a list of titles or outlines is more convenient to a user in a hurry. If there is adequate time, displaying not only text, but also images allows a user to more specifically recognize the contents, achieving high convenience.

Accordingly, the present disclosure proposes an information processing device, a control method, and a program that can determine the granularity of information at the presentation of the information in accordance with a user status.

Solution to Problem

According to the present disclosure, there is provided an information processing device including: a retrieval unit that retrieves information in response to a request of a user; an acquisition unit that acquires information on a current user status; a determination unit that determines granularity of information according to the acquired information on the user status when the retrieved information is presented; and a presentation control unit that controls presentation of the retrieved information with the determined granularity of information.

According to the present disclosure, there is provided a control method including: retrieving information in response to a request of a user; acquiring information on a current user status; determining granularity of information according to the acquired information on the user status when the retrieved information is presented; and controlling presentation of the retrieved information with the determined granularity of information.

According to the present disclosure, there is provided a program for causing a computer to function as: a retrieval unit that retrieves information in response to a request of a user; an acquisition unit that acquires information on a current user status; a determination unit that determines granularity of information according to the acquired information on the user status when the retrieved information is presented; and a presentation control unit that controls presentation of the retrieved information with the determined granularity of information.

Advantageous Effects of Invention

As described above, the present disclosure can determine the granularity of presented information in accordance with a user status.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 3 shows an example of a correspondence between contexts and retrieval information.

FIG. 4 shows examples of changes of display formats for respective contexts and so on.

FIG. 5 shows an example of a correspondence between contexts and display format preferences.

FIG. 6 shows an example of a correspondence between retrieval information and display format preferences.

FIG. 7 shows display format examples.

FIG. 8 shows display format examples.

FIG. 9 shows display format examples.

FIG. 10 shows display format examples.

FIG. 14 shows an example of a method of identifying contexts and so on and a device used.

FIG. 16 is an explanatory diagram showing the addition of priority scores according to a modification (variation 1) of the present embodiment.

FIG. 17 is an explanatory diagram showing the addition of priority scores according to a modification (variation 2) of the present embodiment.

FIG. 18 is an explanatory diagram showing the addition of priority scores according to a modification (variation 2') of the present embodiment.

FIG. 19 is an explanatory diagram showing the addition of priority scores according to a modification (variation 3) of the present embodiment.

DESCRIPTION OF EMBODIMENT(S)

Figure 1:
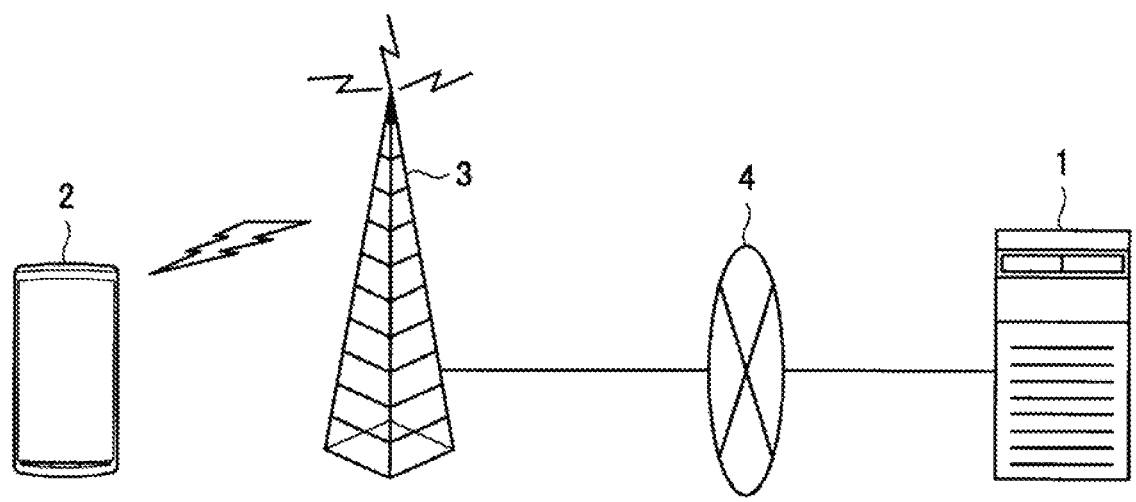
FIG. 1 is an explanatory diagram showing the outline of a control system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description will be made in the following order.
1. The outline of a control system according to an embodiment of the present disclosure
2. Basic configuration
2-1. Sever configuration
2-2. Client configuration
3. Action processing
4. Modification
5. Conclusion 1. The Outline of a Control System According to an Embodiment of the Present Disclosure Referring to FIG. 1, the outline of the control system according to an embodiment of the present disclosure will be first described below. As shown in FIG. 1, the control system according to the present embodiment includes a client 2 that presents information to a user and a server 1 for information retrieval. The client 2 is wirelessly connected to a base station 3 and transmits and receives data to and from the server 1 connected to a network 4.

The server 1 retrieves various kinds of content including restaurant information, product information, event information, news, music, video, or electronic books in response to a request of the client 2, and presents the retrieved information to the client 2.

Although, in conventional retrieval service and recommendation service, a display format is quite a significant factor for presenting various kinds of content to users, conventional information recommendation has focused on only the contents of presented information, but has not taken display formats into consideration.

Thus, in the present embodiment, the current user status can be acquired when retrieved information is presented, and then the granularity of the information can be determined at the presentation of the information according to the user status.

Specifically, referring to the granularity of information associated (defined) with a context indicating information on a user status, the server 1 determines the granularity (display format) of information including the amount of display, a detail level, or a display type when retrieved information is presented.

The outline of the control system according to an embodiment of the present disclosure has been described above. The basic configurations of the server 1 and the client 2 in the control system of the present embodiment will be discussed below.

2. Basic Configuration

<2-1. Server Configuration>

Figure 2:
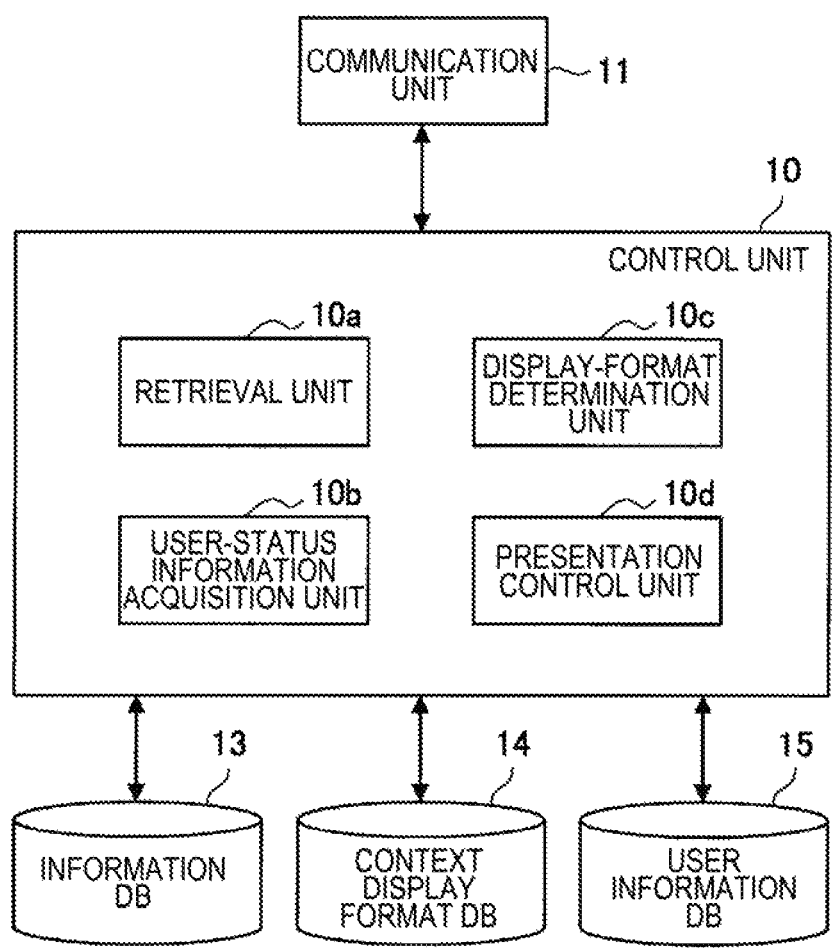
FIG. 2 is a block diagram showing a configuration example of a server according to the present embodiment.

FIG. 2 is a block diagram showing a configuration example of the server 1 according to the present embodiment. As shown in FIG. 2, the server 1 includes a control unit 10, a communication unit 11, an information database (DB) 13, a context display format DB 14, and a user information DB 15.

(Control Unit 10)

The control unit 10 is composed of a microcomputer including, for example, a central processing unit (CPU), a read only memory (ROM), a random access memory (RAM), a nonvolatile memory, and an interface unit. The control unit 10 controls the components of the server 1. Specifically, as shown in FIG. 2, the control unit 10 of the present embodiment functions as a retrieval unit 10a, a user-status information acquisition unit 10b, a display-format determination unit 10c, and a presentation control unit 10d.

Retrieval Unit

In response to a retrieval (or recommendation) request from the client 2, the retrieval unit 10a retrieves information to be presented to a user from the information DB 13. The retrieval request may be made for retrieval based on an explicit user instruction (e.g., a keyword retrieval request or an image retrieval request) or for context retrieval for estimating information to be retrieved based on a status. In the case of context retrieval, for example, the retrieval unit 10a retrieves information with reference to correspondences between contexts and retrieval information (preference for retrieval information) shown in FIG. 3. Specifically, if a request from the client 2 contains a context of "daytime (context type: time)," the retrieval unit 10a retrieves set-meal restaurant information (e.g., information on restaurants that serve inexpensive set meals). If a request from the client 2 contains a context of "night (context type: time)," the retrieval unit 10a retrieves restaurant information (e.g., information on restaurants that serve 1a carte or full-course meals).

In the present embodiment, as shown in FIG. 2, retrieval information is stored in the server 1. The present disclosure is not limited to this location and thus retrieval information may be stored in an external storage unit of the server 1.

User-Status Information Acquisition Unit

The user-status information acquisition unit 10b acquires user status information from the client 2. The user status information indicates, for example, at least one of a current time/date/location (user's current location), the number of persons accompanying a user, the relationship with an accompanying person, the attribute of an accompanying person, a status, an action, daily life, and a device used. In the present specification, the user status information will be referred to as contexts.

Display-Format Determination Unit

The display-format determination unit 10c determines a display format (that is, the granularity of information) for presenting information retrieved by the retrieval unit 10a to the client 2, according to the context, the genre of retrieved information, or the type of the device used (the client 2 who receives the presented information). In the present specification, the display format includes the amount of presented information (e.g., the number of presented retrieval results), a detail level (e.g., at least one of a title, an outline, and a full text to be presented), or a display type (at least one of a text and an image to be presented).

Specifically, the display-format determination unit 10c determines a display format associated (defined) beforehand with a context and so on. Thus, the server 1 of the present embodiment can present desired information to a user in a more suitable display format for the needs of the user. FIG. 4 shows examples of changes of display formats for respective contexts and so on.

As shown in FIG. 4, for example, the context of "morning" suggests that a user is in a hurry and thus the display format is changed to "summary list display," whereas the context of "night" suggests that a user has enough time to read text and thus the display format is changed to "full-text display." Moreover, the context of "home" suggests that there are no strangers around a user and thus the display format is changed to "picture display," whereas the context of a company suggests a public space and thus the display format is changed to "text-only display." During restaurant information retrieval, "one" user only needs the summary of the information and thus the display format is changed to "summary list display," whereas "two or more" monitoring users need to share information to facilitate consultation and thus the display format is changed to "picture display."

Moreover, when a user "is riding a train" or "standing," the display format is changed to "summary list display" that allows quick confirmation. When a user "is sitting," the display format is changed to "full-text display" that allows detailed confirmation. During restaurant information retrieval, a user is likely to identify the feature of a restaurant "in a familiar location" with a small amount of information and thus the display format is changed to "summary list display." Alternatively, "in the first location" or "an unfamiliar location," the display format is changed to "list display with pictures."

Furthermore, in restaurant information retrieval, if an accompanying person "is interested in pictures," the display format is changed to "picture display," whereas if an accompanying person "is interested in contents," the display format is changed to "detail-only display." If the client 2 (device used), to which information is presented, is "cellular phone terminal or smartphone," it is assumed that the client 2 has a relatively small display area. Thus, the display format is changed to "restaurant summary list-only display." If the client 2 is "tablet terminal," it is assumed that the client 2 has a relatively large display area and thus the display format is changed to "picture display."

Referring to FIGS. 5 to 13, the determination of the display format according to the context and so on will be specifically described later.

Presentation Control Unit

The presentation control unit 10d controls information retrieved by the retrieval unit 10a so as to present the information to the client 2 in the display format determined by the display-format determination unit 10c. Specifically, the presentation control unit 10d controls the communication unit 11 so as to transmit a control signal to the client 2. The control signal provides an instruction to present the information retrieved by the retrieval unit 10a, in the display format determined by the display-format determination unit 10c.

(Communication Unit 11)

The communication unit 11 has the function of transmitting and receiving data via a wired or wireless connection to an external device. For example, the communication unit 11 of the present embodiment is connected to the client 2, receives a retrieval request containing a context, and transmits the control signal that provides an instruction to present retrieval results in a predetermined display format under the control of the presentation control unit 10d.

(Information DB 13)

Various kinds of content to be presented to a user, for example, content including restaurant information, product information, event information, news, music, video, or electronic books are stored in the information DB 13.

(Context display format DB 14)

The context display format DB 14 contains reference data for determining display formats according to contexts and so on by the display-format determination unit 10c. Specifically, the reference data indicates, as will be discussed later, correspondences between contexts and display formats shown in FIG. 5 and correspondences between retrieval information and display formats shown in FIG. 6.

(User Information DB 15)

An operation history based on feedback from users is stored in the user information DB 15.

The specific configuration of the server 1 according to the present embodiment has been described above. Referring to FIGS. 5 to 12, the determination of the display formats according to contexts and so on by the display-format determination unit 10c will be specifically described below.

(Correspondence of Display Formats)

Referring to FIGS. 5 and 6, concrete examples of correspondence of display formats will be first described below. FIG. 5 shows an example of a correspondence between contexts and display format preferences. In the present embodiment, correspondence data with the display formats of FIG. 5 is generated beforehand and is stored in the context display format DB 14.

In FIG. 5, if the context type is "the number of accompanying persons," "one user" is associated with the display format of "information list/no image," whereas "two or more users" is associated with the display format of "detailed information/image display." If the context type is "location," "in train" is associated with the display format of "information list/no image," whereas "home" is associated with the display format of "detailed information/image display." If the context type is "time," "morning" is associated with the display format of "information list/no image," whereas "night" is associated with the display format of "detailed information/image display."

Referring to the correspondence data of FIG. 5, the display-format determination unit 10c determines the display format based on contexts contained in a retrieval request from the client 2. The correspondence of the display formats in FIG. 5 is merely exemplary and thus does not limit the present disclosure.

Moreover, the display-format determination unit 10c of the present embodiment may determine the display formats based on retrieval information as well as the contexts. The determination will be specifically described below with reference to FIG. 6.

FIG. 6 shows an example of a correspondence between (the genres of) retrieval information and display format preferences. In the present embodiment, correspondence data with the retrieval information of FIG. 6 is generated beforehand and is stored in a predetermined DB.

In FIG. 6, retrieval information "restaurant" is associated with the display format of "detailed information/image display," whereas "set-meal restaurant" is associated with the display format of "summary list/no image." Furthermore, retrieval information on "entertainment news" is associated with the display format of "detailed information/image display," whereas "sports news" is associated with the display format of "scoreboard display."

Referring to the correspondence data of FIG. 6, the display-format determination unit 10c determines the display format based on (the genre of) information retrieved in response to a retrieval request from the client 2. The correspondence of the display formats in FIG. 6 is merely exemplary and thus does not limit the present disclosure.

(Display Format Example)

Referring to FIGS. 7 to 10, specific display examples of the display formats associated with the data of FIGS. 5 and 6 will be described below. FIGS. 7 to 10 show examples of the display formats. These examples suggest that retrieval information is displayed on the display screen of the client 2 according to the display formats.

For example, a title list display 30 in the left part of FIG. 7 and a title-summary list display 31 in the right part of FIG. 7 are examples of "information list/no image." In the examples of FIGS. 5 and 6, only "information list/no image" is shown. Whether "information list" should be "title list" or "title-summary list" may be determined depending on a user preference calculated from the user history stored in the user information DB 15 or depending on the amount of presented information and the size of the display area of the device used (client 2).

A title-image list display 32 in the left part of FIG. 8 and a title-image-summary list display 33 in the right part of FIG. 8 are examples of "information list/image display."

A detailed information-image display 34 in the left part of FIG. 9 and a detailed information-image-other information display 35 in the right part of FIG. 9 are examples of "detailed information/image display." In the right part of FIG. 9, when sports news is displayed as an example, a scoreboard is displayed as other information.

Examples of "split view" include "two horizontally split views (for cellular phone terminals/smartphones) 36 in the left part of FIG. 10 and two vertically split views (for tablet terminals) 37 in the right part of FIG. 10.

Specific Presentation Examples

Figure 11:
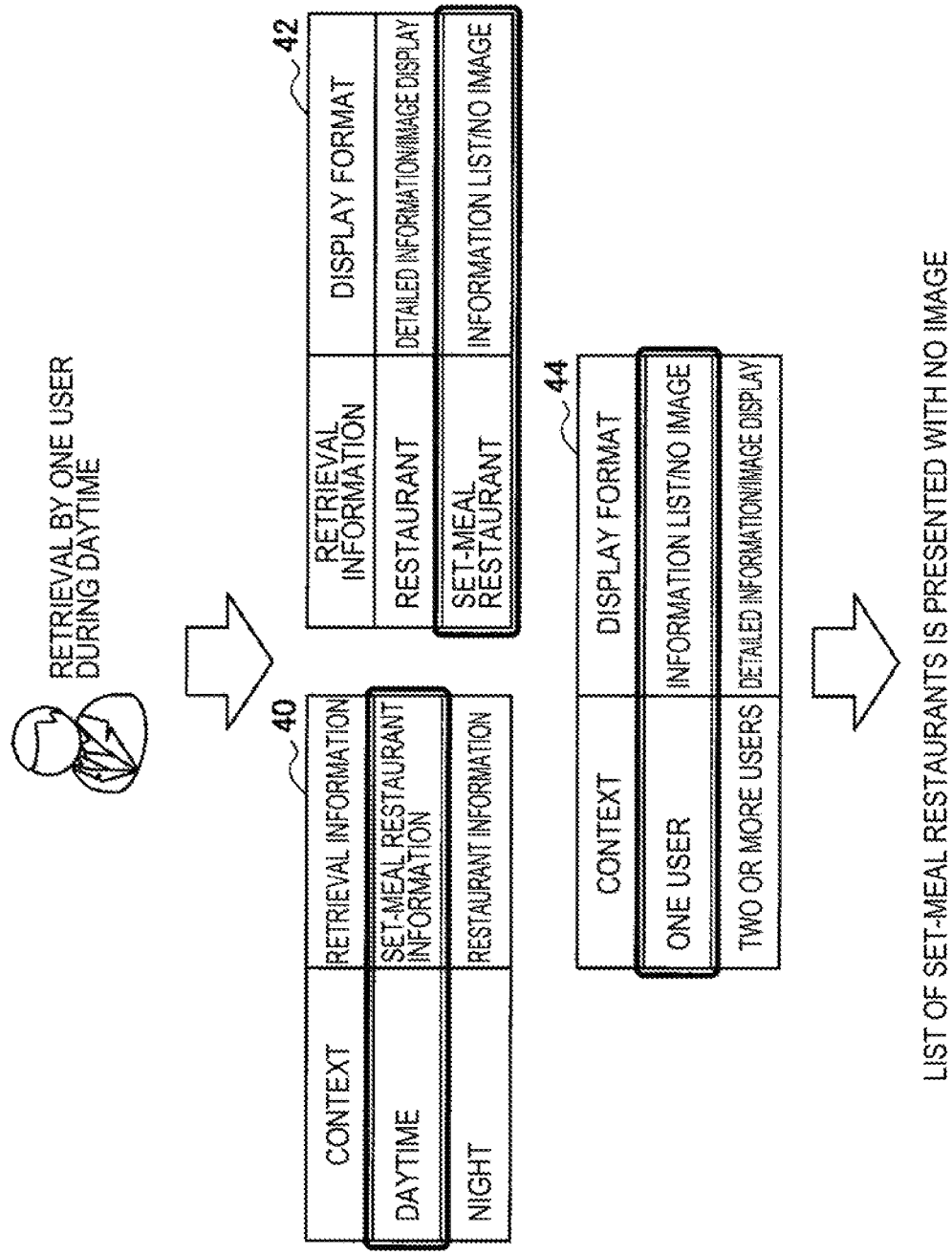
FIG. 11 is an explanatory diagram showing specific presentation examples of the retrieval information.
Figure 12:
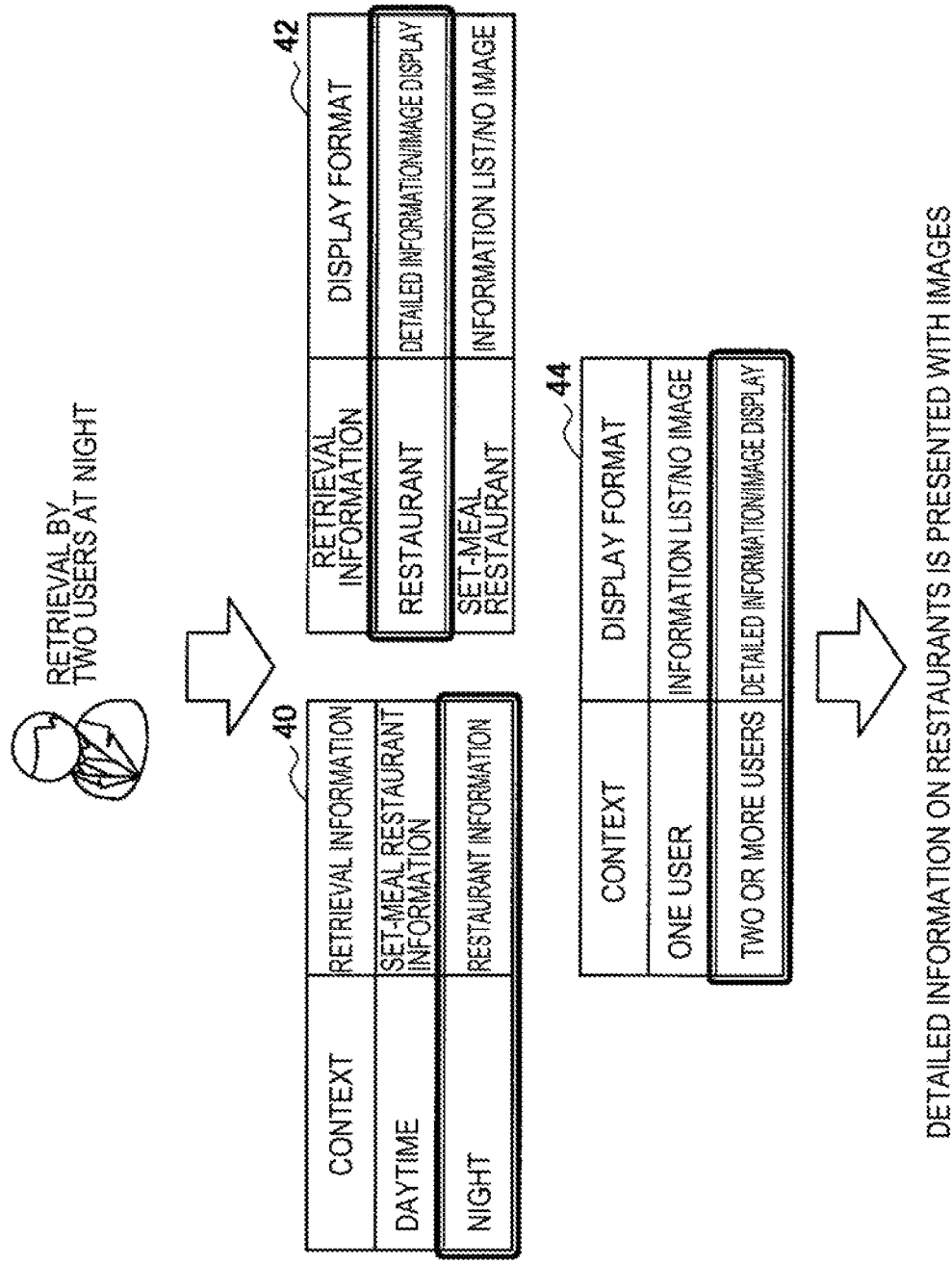
FIG. 12 is an explanatory diagram showing specific presentation examples of the retrieval information.

Referring to FIGS. 11 and 12, specific presentation examples of retrieval information of the sever 1 according to the present embodiment will be described below. FIGS. 11 and 12 are explanatory diagrams showing specific presentation examples of retrieval information.

As shown in FIG. 11, for example, if one user retrieves information during daytime, a context contained in a retrieval request from the client 2 is "daytime" and thus the retrieval unit 10a first retrieves set-meal restaurant information on the assumption that the set-meal restaurant information is requested with reference to a correspondence table 40 of context-retrieval information. Subsequently, the display-format determination unit 10c determines the display format of "information list/no image" with reference to at least one of a correspondence table 42 of a retrieval information-display format and a correspondence table 44 of a context-display format. A list of retrieved set-meal restaurants is then presented in a list format with no image under the control of the presentation control unit 10d.

As shown in FIG. 12, for example, if two users retrieve information at night, a context contained in a retrieval request from the client 2 is "night" and thus the retrieval unit 10a first retrieves restaurant information on the assumption that the restaurant information is requested with reference to the correspondence table 40 of context-retrieval information. Subsequently, the display-format determination unit 10c determines the display format of "detailed information/image display" with reference to at least one of the correspondence table 42 of the retrieval information-display format and the correspondence table 44 of the context-display format. Detailed information on retrieved restaurants is presented with images under the control of the presentation control unit 10d.

The determination of the display format according to a context and so on has been specifically described above with reference to the specific examples according to the present embodiment.

<2-2. Client Configuration>

Figure 13:
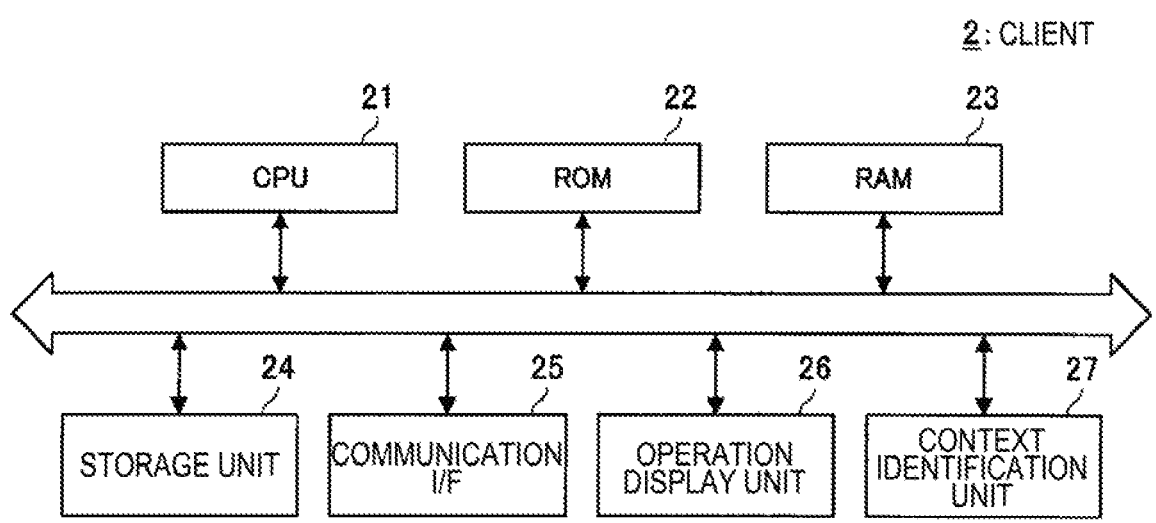
FIG. 13 is a block diagram showing a configuration example of a client according to the present embodiment.

Referring to FIG. 13, the client 2 of the present embodiment will be described below. FIG. 13 is a block diagram showing a configuration example of the client 2. The client 2 may be a smartphone terminal shown in FIG. 1, a tablet terminal, a cellular phone terminal, a personal digital assistant (PDA), a personal computer (PC), a portable music player, a portable game machine, or a wearable terminal (e.g., a head mounted display (HMD), a spectacle HMD, a smartwatch terminal, or a wrist band terminal).

As shown in FIG. 13, the client 2 includes a CPU 21, a ROM 22, a RAM 23, a storage unit 24, a communication interface (I/F) 25, an operation display unit 26, and a context identification unit 27. In the client 2, these components are connected via, for example, a bus serving as a data transmission path.

The CPU 21 includes, for example, a microcomputer and controls the components of the client 2. For example, the CPU 21 functions as a display control unit that controls the operation display unit 26, which will be discussed later, so as to display retrieval information in a specified display format in response to the control signal transmitted from the server 1 through the communication I/F 25.

The ROM 22 contains programs used by the CPU 21 and control data including an operation parameter. The RAM 23 temporarily contains, for example, programs executed by the CPU 21.

The storage unit 24 contains various kinds of data. For example, the storage unit 24 can temporarily contain retrieval information transmitted from the server 1 through the communication I/F 25 and an instruction of a display format.

The communication I/F 25 is communication means included in the client 2 and communicates through the network 4 (or directly) with an external device included in the control system of the present embodiment. For example, the communication I/F 25 is wirelessly connected to the base station 3. The communication I/F 25 transmits a retrieval request including a context and information on a device used, to the server 1 on the network 4 through the base station 3.

The operation display unit 26 has an operation input function and a display function. The operation input function is specifically implemented by a touch sensor for receiving an operational input to a display screen. The display function is implemented by, for example, a liquid crystal display (LCD) or an organic light-emitting diode (OLED). On the display screen, retrieval information is displayed in a specified display format under the control of the CPU 21 (FIGS. 7 to 10).

The context identification unit 27 identifies contexts (specifically, information on a user status) and so on that are transmitted with a retrieval request to the server 1, based on various sensors. FIG. 14 shows an example of a method of identifying contexts and so on and a device used. Referring to FIG. 14, the client 2 will also be referred to as a device.

As shown in FIG. 14, the context identification unit 27 identifies, for example, "time" from an internal clock of the device and "location" from a global positioning system (GPS) of the device. Moreover, the context identification unit 27 identifies "the number of accompanying persons" based on the number of detected devices of accompanying persons through communication with other devices near the context identification unit 27 via Bluetooth (registered trademark), infrared communication, Wi-Fi (registered trademark), or proximity wireless communication of the device. The location is not always identified by the GPS as long as a position information acquisition unit included in the device can be used. The position information acquisition unit may detect a position via, for example, Wi-Fi (registered trademark), transmission and reception to and from a cellular phone, a PHS phone, or a smartphone, or short-distance communication in addition to the GPS.

Furthermore, the context identification unit 27 identifies "user status/action" based on sensor information obtained by various sensors (e.g., the position information acquisition sensor, an acceleration sensor, a geomagnetism sensor, or a gyro sensor) included in the device. Specifically, the context identification unit 27 identifies whether a user is standing, sitting, walking, riding on a bicycle, or riding a train, based on the sensor information.

Moreover, the context identification unit 27 identifies "daily life" by comparing an ordinary user action pattern with an action model. Specifically, the context identification unit 27 acquires a current user action (a position or time) via the GPS and so on, and then compares the user action with the ordinary action model to identify whether the current user action is similar (ordinary) or dissimilar (extraordinary) to the ordinary action model.

The context identification unit 27 identifies "accompanying person" based on a user attribute obtained from the device of an accompanying person through communication with other devices near the context identification unit 27 via Bluetooth (registered trademark), infrared communication, Wi-Fi (registered trademark), or proximity wireless communication of the device. Specifically, the context identification unit 27 identifies the attribute of the accompanying person and the relationship between the accompanying person and the user based on the user attribute obtained from the device of the accompanying person.

Moreover, the context identification unit 27 identifies "device used" from the device information of the device. Specifically, the context identification unit 27 identifies the type of the device 2 (a cellular phone terminal, a smartphone, or a tablet terminal) based on device information stored in the storage unit 24.

The configurations of the server 1 and the client 2 that are included in the control system according to the present embodiment have been specifically described above. The configurations of the server 1 and the client 2 are merely exemplary and thus do not limit the present disclosure. For example, the client 2 may include at least a part of the configuration of the server 1.

3. Action Processing

Figure 15:
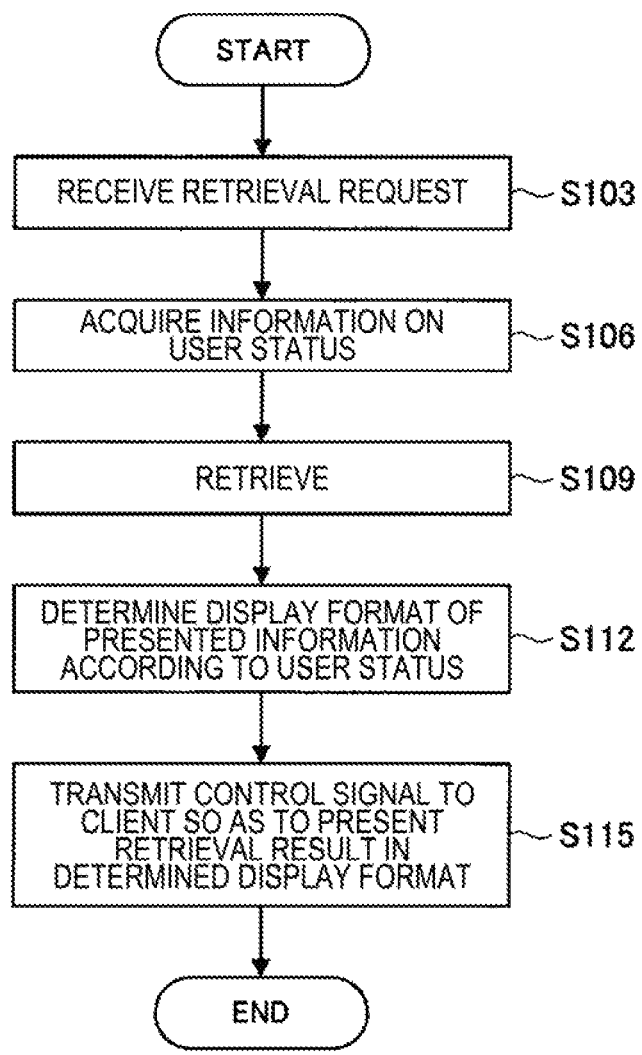
FIG. 15 is a flowchart showing the action processing of a control system according to the present embodiment.

Referring to FIG. 15, the action processing of the control system according to the present embodiment will be described below.

FIG. 15 is a flowchart showing the action processing of the control system according to the present embodiment. As shown in FIG. 15, the server 1 first receives a retrieval request from the client 2 in step S103.

Subsequently, in step S106, the user-status information acquisition unit 10b of the server 1 acquires information (context) on a user status included in the retrieval request.

After that, in step S109, the retrieval unit 10a retrieves information in response to the retrieval request.

Subsequently, in step S112, the display-format determination unit 10c determines the display format of information to be presented, according to the user status (context). In this example, the display format is determined according to the user status. As described above, the display-format determination unit 10c can also determine the display format according to (the genre of) retrieval information or the type of device to which the information is presented, in addition to the user status.

After that, in step S115, the presentation control unit 115 transmits the control signal to the client, the control signal providing an instruction to present retrieval results in the display format determined by the display-format determination unit 10c.

4. Modification

The configuration and action processing of the control system according to the present embodiment have been specifically described above. In the specific examples of FIGS. 11 and 12, when a display format is determined using the correspondence table 44 of a context-display format, only one context type ("the number of accompanying persons" in FIGS. 11 and 12) is referred. However, two or more context types may be obtained instead. In this case, for example, if one of the contexts is associated with the display format of "detailed information/image display" and the other context is associated with the display format of "information list/no image," the conditions of the display formats are contradictory to each other.

Thus, a modification of the present embodiment proposes that a context type or a context is provided with a priority score beforehand to resolve the contradiction according to the priority score. In the following explanation, the contradiction is resolved in various ways according to priority scores. In the present specification, the priority scores will also be referred to as scores.

<4-1. Variation 1>

First, a scoring method for each context type is proposed as variation 1. FIG. 16 is an explanatory diagram showing the addition of priority scores according to variation 1. In FIG. 16, a priority score "2.0" is added to the context type of "location," a priority score "1.5" is added to the context type of "the number of accompanying persons," and a priority score "0.7" is added to the context type of "time."

In this case, if the contexts of "in train" and "two or more persons" are obtained from a retrieval request transmitted from the client 2, "in train" is associated with "information list/no image" and "two or more persons" is associated with "detailed information/image display" as shown in FIG. 5, resulting in the contradiction of the display formats. Thus, according to the scores of FIG. 16, the display-format determination unit 10c determines that the display format is to be "information list/no image" associated with "in train" because the context type of "location" for "in train" has a score of "2.0" that is higher than "1.5," the score of the contradictory context type of "the number of accompanying persons" for "two or more persons" (2.0>1.5).

If the contexts of "in train," "two or more persons," and "night" are obtained from a retrieval request transmitted from the client 2, "in train" is associated with "information list/no image" while "two or more persons" and "night" are associated with "detailed information/image display," resulting in contradiction. In this case, the context type "location" for "in train" has a score of "2.0" that is lower than the sum of the score "1.5" of the contradictory context type of "the number of accompanying persons" for "two or more persons" and the score "0.7" of the context type of "time" for "night" (2.0<1.5+0.7). Thus, the display-format determination unit 10c determines that the display format is to be "detailed information/image display" associated with "two or more persons" and "night."

<4-2. Variation 2>

A scoring method for each context is proposed as variation 2. FIG. 17 is an explanatory diagram showing the addition of priority scores according to variation 2. As shown in FIG. 17, a priority score is added to each context. For example, "2.0" is added to "one person," "1.5" is added to "two or more persons," and "2.0" is added to "in train."

In this case, if the contexts of "in train" and "two or more persons" are obtained from a retrieval request transmitted from the client 2, the display formats are contradictory to each other (FIG. 5). In this case, with reference to the scores of FIG. 17, the display-format determination unit 10c determines that the display format is to be "information list/no image" associated with "in train" because the score "2.0" for "in train" is higher than the score "1.5" for contradictory "two or more persons" (2.0>1.5).

If the contexts of "in train," "two or more persons," and "night" are obtained from a retrieval request transmitted from the client 2, the display formats of "in train," "two or more persons," and "night" are contradictory to one another (FIG. 5). In this case, with reference to the scores of FIG. 17, the display-format determination unit 10c determines that the display format is to be "detailed information/image display" associated with "two or more persons" and "night" based on the sum of the score "2.0" for "in train," the score "1.5" for "two or more persons," and the score "0.7" for "night" (2.0<1.5+0.7).

<4-3. Variation 2'>

A method for scoring of each context and permission of the addition of multiple scores is proposed as variation 2'. FIG. 18 is an explanatory diagram showing the addition of priority scores according to variation 2'. As shown in FIG. 18, for example, a priority score "2.0" for "in train" is added to the display format of "information list/no image" and a priority score "1.0" for "in train" is added to the display format of "detailed information/image display."

In this case, if the contexts of "in train" and "two or more persons" are obtained from a retrieval request transmitted from the client 2, the display formats are contradictory to each other (FIG. 5). In this case, with reference to the scores of FIG. 18, the display-format determination unit 10c determines that the display format is to be "detailed information/image display" based on the score "2.0" for the display format of "information list/no image" and the score "1.0+1.5" for the contradictory display format of "detailed information/image display" (2.0<1.0+1.5).

<4-4. Variation 3>

A method of categorizing the display formats and adding a score to each category is proposed as variation 3. FIG. 19 is an explanatory diagram showing the addition of priority scores according to variation 3. The display format categories include, for example, "detail level" and "image."

In FIG. 19, for example, a priority score "2.0" is added to "information list" in the display format category of "detail level" for the context of "in train" and a priority score "3.0" is added to "no image" in the category of "image display." Moreover, a priority score "2.0" is added to "detailed information" in the display format category of "detail level" for the context of "two or more persons" and a priority score "2.0" is added to "image display" in the category of "image." Furthermore, a priority score "0.2" is added to "detailed information" in the display format category of "detail level" for the context of "night" and a priority score "0.2" is added to "image display" in the category of "image."

In this method, if the contexts of "in train," "two or more persons," and "night" are obtained from a retrieval request transmitted from the client 2, the display formats of "in train," "two or more persons," and "night" are contradictory to one another (FIG. 5). In this case, with reference to the scores of FIG. 19, the display-format determination unit 10c determines that the display format is to be "detailed information" in the display format category of "detailed level" based on the score "2.0" of an information list and the score "2.0+0.2" of detailed information (2.0<2.0+0.2). In the display format category of "image," the display-format determination unit 10c determines that the display format is to be "no image" based on a score "3.0" with no image and a score "2.0+0.2" with image display (3.0>2.0+0.2). Thus, the display-format determination unit 10c can determine that the display format is to be "detailed information/no image" by combining the categories having high total scores.

As in variation 2', multiple scores may be added to each of the categories.

The examples of display format categories are not limited to "detail level" or "image" and may include, for example, "the number of displays (amount of display)" (1, 2, 3, . . . ), "display area" (e.g., a full screen, a right half, or only a status bar), and "additional information" (e.g., scoreboard or stock price information). In the category of "detail level," "title only," "summary only," or "title/summary" may be defined as the display contents of the information list and "full-text display" may be defined as the display contents of detailed information.

The values of the priority scores in FIGS. 16 to 19 are merely exemplary and thus do not limit the present embodiment.

<4-5. User Feedback>

Although the above-described priority scores are added beforehand, the control unit 10 of the server 1 according to the present embodiment may change the priority scores according to user feedback obtained from the client 2. This will be specifically described below with reference to FIG. 20.

Figure 20:
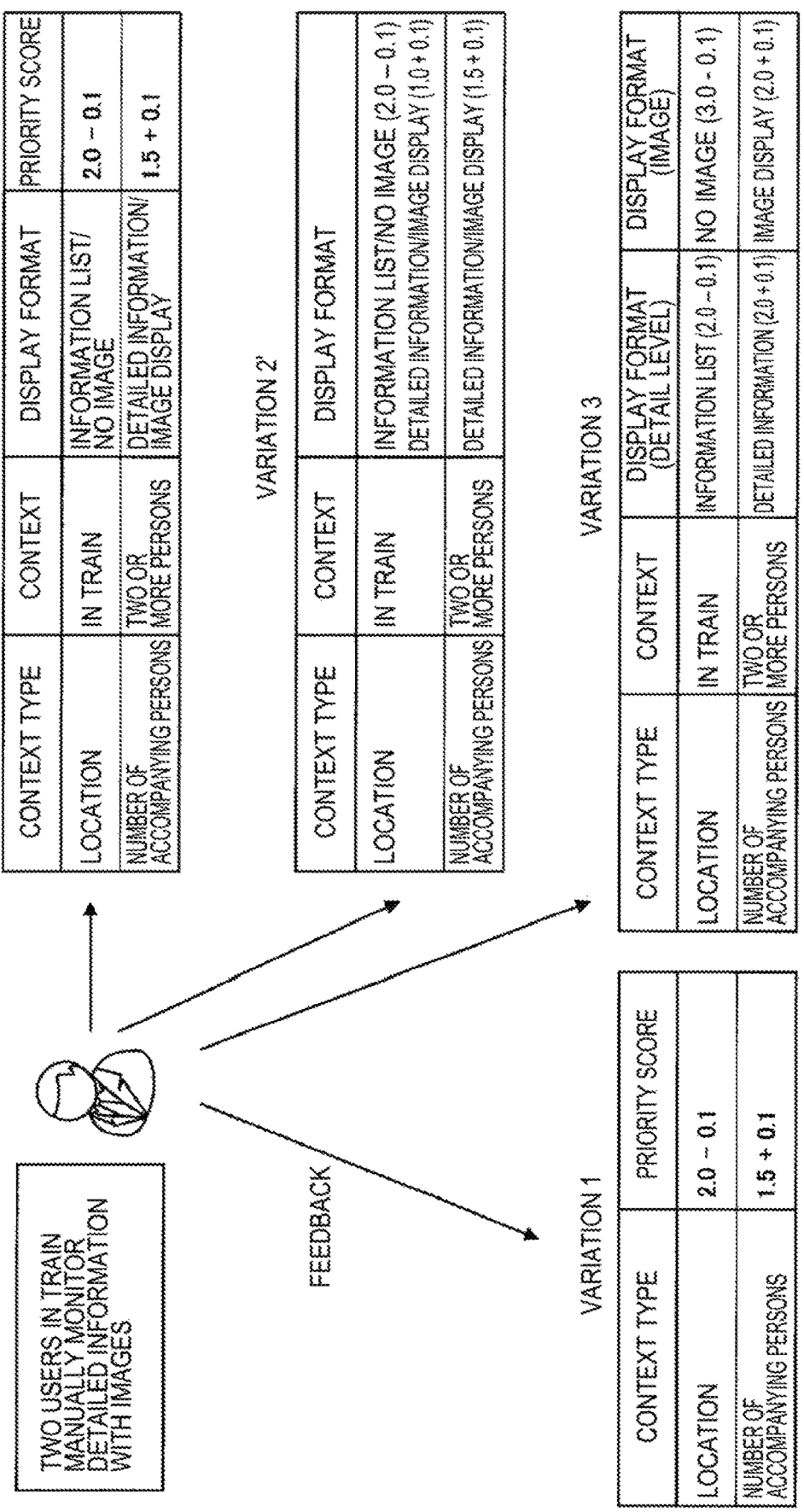
FIG. 20 is an explanatory diagram showing changes of the priority scores according to feedback from a user.

FIG. 20 is an explanatory diagram showing changes of the priority scores according to feedback from a user. For example, if the contexts "in train" and "two persons" are obtained in variations 1 and 2, the display-format determination unit 10c determines that the display format is to be "detailed information/no image" and the presentation control unit 10d presents retrieval results in the display format of "detailed information/no image." However, if a user manually changes the display format of the presented information to "detailed information/image display" as shown in FIG. 20, the changing operation is fed back to the server 1 from the client 2.

In this case, the control unit 10 of the server 1 changes the priority score. Specifically, the control unit 10 adds "−0.1" to the display format before the user changes the display format, whereas the control unit 10 adds "+0.1" to the display format after the user changes the display format.

In a correction of the priority score in variation 1, before a change of the display format, the display format is "information list/no image" (FIG. 5) associated with "in train" of the context type "location" having a high score. Thus, "−0.1" is added to the context type of "location." After a change of the display format, the display format is "detailed information/image display" (FIG. 5) associated with "two or more persons" of the context type "the number of accompanying persons" having a low score. Thus, "+0.1" is added to the context type of "the number of accompanying persons."

As described above, the priority scores are changed according to user feedback. The priority scores may be generated beforehand based on operation histories of a user which are accumulated in the user information DB 15.

5. Conclusion

As described above, when retrieved information is presented, the control system according to the embodiment of the present disclosure can obtain the current user status and determine the granularity of presented information according to the user status.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, computer programs having the functions of the server 1 and the client 2 can be generated in hardware such as a CPU, ROM, and RAM included in the server 1 and the client 2. There is also provided a computer-readable storage medium having the computer programs stored therein.

The correspondence of the display formats is not limited to the foregoing examples. For example, "two or more persons" is associated with "detailed information/image display" in FIG. 5. Retrieval results may be displayed separately on multiple devices, for example, "user device; detailed information, other user devices; images." Thus, the user device (client 2) is controlled to display detailed information on retrieval results (specifically, full-text display) on the display unit of the user device in response to an instruction from the server 1; meanwhile, other user devices wirelessly connected via infrared communication or Wi-Fi (registered trademark) are controlled to display the images of retrieval results. This can present retrieval results to two or more users in the display format that allows more effective use of the user devices.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)
An information processing device including:
a retrieval unit that retrieves information in response to a request of a user;
an acquisition unit that acquires information on a current user status;
a determination unit that determines granularity of information according to the acquired information on the user status when the retrieved information is presented; and
a presentation control unit that controls presentation of the retrieved information with the determined granularity of information.

(2)
The information processing device according to (1), wherein the granularity of information includes an amount of display, a detail level, or a display type when the retrieved information is presented, and
the determination unit determines the granularity of information associated with a context indicating the information on the user status.

(3)
The information processing device according to (2), wherein the amount of display is determined by the number of presentations of the retrieved information,
the detail level is determined by presenting at least one of a title, a summary, and a full text of the retrieved information, and
the display type is determined by presenting at least one of a text and an image.

(4)
The information processing device according to any one of (1) to (3), wherein the determination unit determines the granularity of information based on a weight assigned to a context indicating the information on the user status.

(5)
The information processing device according to (4), wherein the weight assigned to the context is changed according to feedback from the user.

(6)
The information processing device according to (4), wherein the weight assigned to the context is set based on an operation history of the user.

(7)
The information processing device according to any one of (1) to (6), wherein the information on the user status is at least one of a current time, a day of a week, and a location.

(8)
The information processing device according to any one of (1) to (7), wherein the information on the user status is at least one of the number of currently accompanying persons, a relationship with the accompanying person, and an attribute of the accompanying person.

(9)
The information processing device according to any one of (1) to (8), wherein the information on the user status is one of a current user status and an action.

(10)
The information processing device according to any one of (1) to (9), wherein the determination unit determines that the granularity of information is to be associated with a genre of the retrieved information.

(11)
The information processing device according to any one of (1) to (10), wherein the determination unit determines that the granularity of information is to be associated with a type of device to which the information is presented under control of the presentation control unit.

(12)
A control method including:
retrieving information in response to a request of a user;
acquiring information on a current user status;

determining granularity of information according to the acquired information on the user status when the retrieved information is presented; and controlling presentation of the retrieved information with the determined granularity of information.

(13)

A program for causing a computer to function as:

a retrieval unit that retrieves information in response to a request of a user;

an acquisition unit that acquires information on a current user status;

a determination unit that determines granularity of information according to the acquired information on the user status when the retrieved information is presented; and a presentation control unit that controls presentation of the retrieved information with the determined granularity of information.

REFERENCE SIGNS LIST 1 server
10 control unit
10a retrieval unit
10b user-status information acquisition unit
10c display-format determination unit
10d presentation control unit
11 communication unit
13 information DB
14 context display format DB
15 user information DB
2 client
21 CPU
22 ROM
23 RAM
24 storage unit
25 communication I/F
26 operation display unit
27 context identification unit

The invention claimed is:

1. An information processing device that controls a display format on a client device, the device comprising:

retrieval circuitry configured to retrieve information in response to receiving a request originating from the client device;

acquisition circuitry configured to acquire status information from the received request, the acquired status information based on a current user status, the current user status being determined by the client device having context identification circuitry which identified a context type of the status as being either: a single user context type or two or more person accompanying the user context type by receiving an indication of there being one or more accompanying person, and by the client device configured to communicate wirelessly with proximately located one or more another client device associated with the one or more accompanying person, wherein the context identification circuitry further identify whether the user is riding, standing or sitting using sensor information;

determination circuitry configured to determine a granularity of the retrieved information to present according to the acquired status, wherein the status information include user current location and current time information; and presentation control circuitry configured to control presentation of the retrieved information on an operation display unit of the client device according to the determined granularity of information based on the context type, wherein the granularity of information includes an amount of display, a detail level, and a display type when the retrieved information is presented; and the presentation control circuitry further configured to transmit a control signal directed to the client device, which causes the client device to present the display format on its operation display unit according to the context type determined granularity of information, wherein the context type determined granularity causes the display format to be an information summary listing display format when the current time is morning and the context type is the single user context type with standing or riding, and causes the display format to be a detailed information display format when current time is night and current location is home with the context type is the two or more persons accompanying the user context type.

2. The information processing device according to claim 1, the determination circuitry determines the granularity of information associated with a context indicating the information on the user status.

3. The information processing device according to claim 1, wherein the amount of display is determined by the number of presentations of the retrieved information, the detail level is determined by presenting at least one of a title, a summary, and a full text of the retrieved information, and the display type is determined by presenting at least one of a text and an image.

4. The information processing device according to claim 1, wherein the determination circuitry determines that the granularity of information is to be associated with a genre of the retrieved information, and the genre is restaurant information.

5. The information processing device according to claim 4, wherein the weight assigned to the context is changed according to feedback from the user.

6. The information processing device according to claim 4, wherein the weight assigned to the context is set based on an operation history of the user.

7. The information processing device according to claim 1, wherein the information on the user status further includes a relationship with the accompanying person.

8. The information processing device according to claim 1, wherein the information on the user status is one of a current user status and an action.

9. The information processing device according to claim 1, wherein the determination circuitry determines that the granularity of information is to be associated with a genre of the retrieved information.

10. The information processing device according to claim 1, wherein the determination circuitry determines that the granularity of information is to be associated with a type of device to which the information is presented under control of the presentation control circuitry.

11. The information processing device according to claim 1, wherein the information on the user status further includes a day of a week.

12. The information processing device according to claim 1, wherein the information on the user status further includes a location.

13. The information processing device according to claim 1, wherein the information on the user status further includes an attribute of the accompanying person.

14. A control method comprising:
retrieving information in response to receiving a request originating from the client device;
acquiring status information from the received request, the acquired status information based on a current user status, the current user status being determined by the client device having context identification circuitry which identified a context type of the status as being either: a single user context type or two or more person accompanying the user context type by receiving an indication of there being one or more accompanying person, and by the client device configured to communicate wirelessly with proximately located one or more another client device associated with the one or more accompanying person, wherein the context identification circuitry further identify whether the user is riding, standing or sitting using sensor information;
determining a granularity of the retrieved information to present according to the acquired status, wherein the status information include user current location and current time information; and
controlling presentation of the retrieved information on an operation display unit of the client device according to the determined granularity of information based on the context type, wherein the granularity of information includes an amount of display, a detail level, and a display type when the retrieved information is presented; and
transmitting a control signal directed to the client device, which causes the client device to present the display format on its operation display unit according to the context type determined granularity of information, wherein the context type determined granularity causes the display format to be an information summary listing display format when the current time is morning and the context type is the single user context type with standing or riding, and causes the display format to be a detailed information display format when current time is night and current location is home with the context type is the two or more persons accompanying the user context type.

15. A program for causing a computer to function as:
retrieval circuitry configured to retrieve information in response to receiving a request originating from the client device;
acquisition circuitry configured to acquire status information from the received request, the acquired status information based on a current user status, the current user status being determined by the client device having context identification circuitry which identified a context type of the status as being either: a single user context type or two or more person accompanying the user context type by receiving an indication of there being one or more accompanying person, and by the client device configured to communicate wirelessly with proximately located one or more another client device associated with the one or more accompanying person, wherein the context identification circuitry further identify whether the user is riding, standing or sitting using sensor information;
determination circuitry configured to determine a granularity of the retrieved information to present according to the acquired status, wherein the status information include user current location and current time information; and
presentation control circuitry configured to control presentation of the retrieved information on an operation display unit of the client device according to the determined granularity of information based on the context type, wherein the granularity of information includes an amount of display, a detail level, and a display type when the retrieved information is presented; and
the presentation control circuitry further configured to transmit a control signal directed to the client device, which causes the client device to present the display format on its operation display unit according to the context type determined granularity of information, wherein the context type determined granularity causes the display format to be an information summary listing display format when the current time is morning and the context type is the single user context type with standing or riding, and causes the display format to be a detailed information display format when current time is night and current location is home with the context type is the two or more persons accompanying the user context type.

* * * * *